(12) United States Patent
Moriya

(10) Patent No.: US 12,539,266 B2
(45) Date of Patent: Feb. 3, 2026

(54) COSMETIC COMPOSITION

(71) Applicant: Shin-Etsu Chemical Co., Ltd., Tokyo (JP)

(72) Inventor: Hiroyuki Moriya, Annaka (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 708 days.

(21) Appl. No.: 17/905,947

(22) PCT Filed: Mar. 11, 2021

(86) PCT No.: PCT/JP2021/009758
§ 371 (c)(1),
(2) Date: Sep. 9, 2022

(87) PCT Pub. No.: WO2021/187306
PCT Pub. Date: Sep. 23, 2021

(65) Prior Publication Data
US 2023/0106469 A1    Apr. 6, 2023

(30) Foreign Application Priority Data
Mar. 18, 2020 (JP) ................................ 2020-047823

(51) Int. Cl.
| | |
|---|---|
| *A61K 8/896* | (2006.01) |
| *A61K 8/02* | (2006.01) |
| *A61K 8/06* | (2006.01) |
| *A61K 8/34* | (2006.01) |
| *A61K 8/73* | (2006.01) |
| *A61K 8/92* | (2006.01) |
| *A61Q 1/12* | (2006.01) |
| *A61Q 17/04* | (2006.01) |

(52) U.S. Cl.
CPC .............. *A61K 8/896* (2013.01); *A61K 8/022* (2013.01); *A61K 8/06* (2013.01); *A61K 8/34* (2013.01); *A61K 8/73* (2013.01); *A61K 8/92* (2013.01); *A61Q 1/12* (2013.01); *A61Q 17/04* (2013.01)

(58) Field of Classification Search
CPC .. C08B 15/04; C08B 3/06; C08B 5/00; C08B 11/12; C08B 15/02; C08B 3/04; C08B 3/08; C08B 3/16; C08B 3/22; C08B 3/24; C08B 16/00; A61K 2800/10; A61K 8/73; A61K 8/731; A61K 8/891; A61K 8/89; A61K 8/898; A61K 8/585; A61K 8/25; A61K 8/342; A61K 8/361; A61K 8/92
See application file for complete search history.

(56) References Cited

U.S. PATENT DOCUMENTS

| | | |
|---|---|---|
| 5,583,244 A | 12/1996 | Uchida et al. |
| 2013/0267478 A1 | 10/2013 | Kamei |
| 2017/0224608 A1 | 8/2017 | Fujiyama et al. |
| 2018/0133144 A1 | 5/2018 | Konishi et al. |
| 2019/0216711 A1 | 7/2019 | Fujii et al. |

FOREIGN PATENT DOCUMENTS

| | | | | |
|---|---|---|---|---|
| JP | H06145201 A | 5/1994 | | |
| JP | H08134103 A | 5/1996 | | |
| JP | H09136901 A | * 5/1997 | ............... | A61K 8/00 |
| JP | H029910 B2 | 2/1998 | | |
| JP | H1029921 A | 2/1998 | | |
| JP | 2001278729 A | 10/2001 | | |
| JP | 2647366 A2 | * 10/2013 | ............... | A61K 8/73 |
| JP | 2013216583 A | 10/2013 | | |
| JP | 2017218413 A | 12/2017 | | |
| WO | 2012133293 A1 | 10/2012 | | |
| WO | 2016199644 A1 | 12/2016 | | |

OTHER PUBLICATIONS

JPH09136901A translation. (Year: 1997).*
Extended European Search Report corresponding to European Application No. 21771910.3 (Mar. 5, 2024).
English translation of International Search Report corresponding to International Patent Application No. PCT/JP2021/009758 (2 pages) (mailed May 11, 2021).

* cited by examiner

*Primary Examiner* — Audrea B Coniglio
(74) *Attorney, Agent, or Firm* — Myers Bigel, P.A.

(57) ABSTRACT

One of the objects of the present invention is to provide a cosmetic composition that comprises water-soluble silicone-modified polysaccharides and water, is capable of being blended in an aqueous phase of an emulsion, and improves the feeling during use, such as oiliness and stickiness. Furthermore, another object of the present invention is to provide a cosmetic composition that has water resistance and oil resistance, has excellent makeup durability, and does not come off with water but can be removed with warm water. The present invention provides a cosmetic composition comprising the following components (A) and (B): (A) a silicone-modified polysaccharide comprising one or more silicone residues bonded to a hydroxyl group in a monosaccharide unit of the polysaccharide, the silicone residues being represented by the general formula (1) and having an average number of the silicone residues bonded to one mol of the monosaccharide unit of 0.001 mol or more and 0.1 mol or less, in an amount of 0.05% to 20% by mass, based on a total mass of the cosmetic composition, and (B) water in an amount of 5% to 99% by mass, based on the total mass of the cosmetic composition.

20 Claims, 1 Drawing Sheet

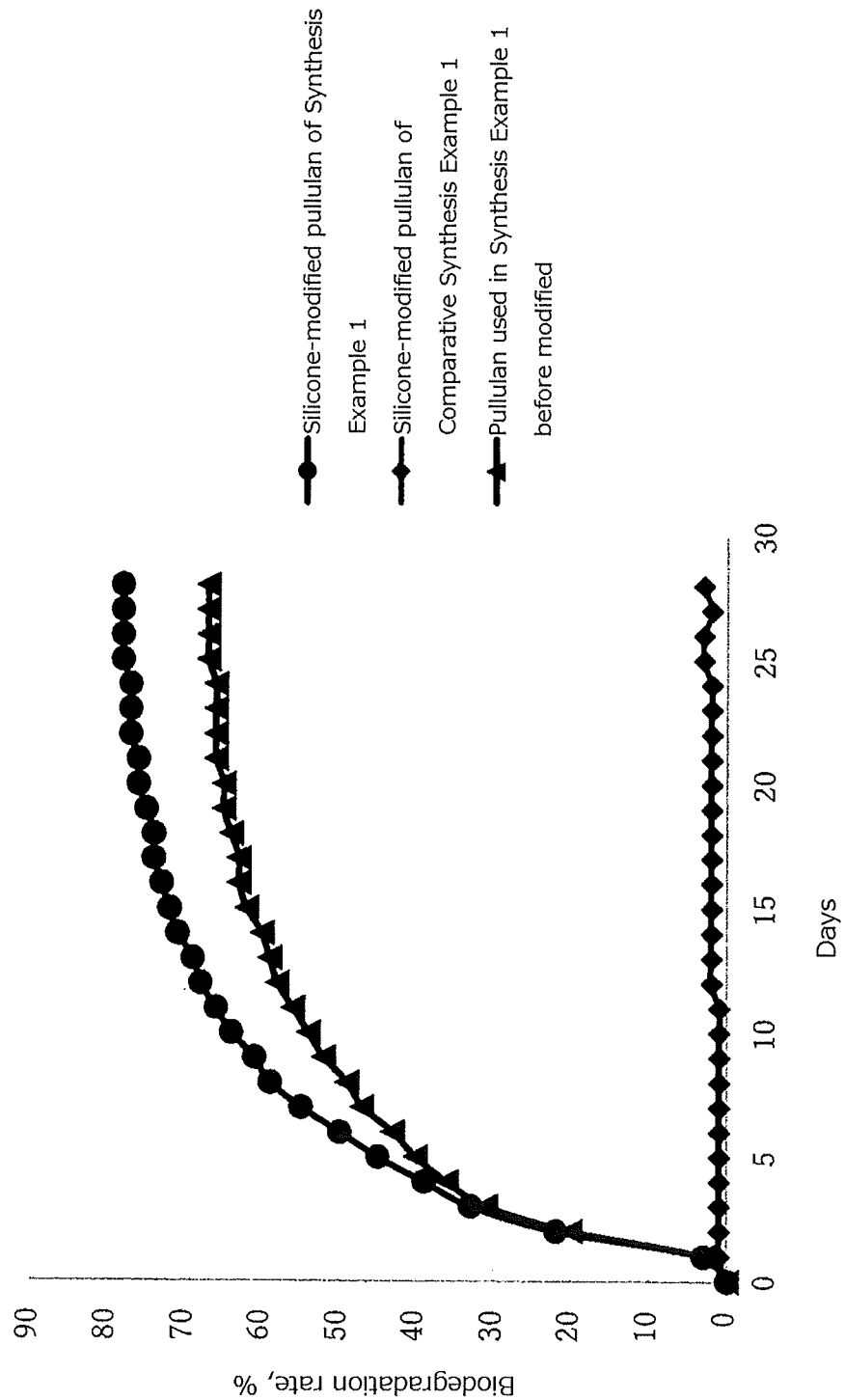

COSMETIC COMPOSITION

TECHNICAL FIELD

The present invention relates to a cosmetic composition comprising a water-soluble silicone-modified polysaccharide and water.

BACKGROUND ART

Previously, silicone-modified polysaccharides obtained by modifying silicone with respect to polysaccharides have been studied (Patent Documents 1 and 2). For example, Patent Document 1 discloses a water-stable siloxane-containing cellulose derivative exhibiting properties of both cellulose and silicone. Patent Document 2 discloses stable siloxane-containing pullulan exhibiting properties of both pullulan and a silicone compound. Blending silicone-modified polysaccharides in cosmetics has also been studied (Patent Documents 3 to 6). Patent Document 3 discloses a sunscreen cosmetic comprising a specific siliconized polysaccharide compound in combination with an organic ultraviolet absorber. Patent Document 4 discloses a water-in-oil type emulsified cosmetic comprising a siliconized polysaccharide compound. Patent Document 6 discloses a cosmetic composition comprising siliconized pullulan for the eye area. As disclosed in Patent Documents 3 to 6, cosmetics comprising silicone-modified polysaccharides have high water resistance and oil resistance, and also have an excellent feeling during use.

PRIOR LITERATURES

Patent Literatures

Patent Document 1: Japanese Patent Application Laid-Open No.-Hei 6-145201
Patent Document 2: Japanese Patent Application Laid-Open No.-Hei 8-134103
Patent Document 3: Japanese Patent Application Laid-Open No.-Hei 10-29921
Patent Document 4: Japanese Patent Application Laid-Open No.-2001-278729
Patent Document 5: WO 2012/133293
Patent Document 6: Japanese Patent Application Laid-Open No.-2017-218413

SUMMARY OF THE INVENTION

Problems to be Solved by the Invention

However, conventional silicone-modified polysaccharides have a high proportion of silicone. Such silicone-modified polysaccharides are mainly blended in the oil phase, so that the silicone-modified polysaccharides are blended in oil-based cosmetics. Therefore, they have restrictions on blending, in addition to problems such as oiliness and stickiness, which are characteristic of oil-based cosmetics. In addition, a problem with silicone-modified polysaccharides is that since they have excessive water resistance, they cannot be removed without special oil cleansing. In contrast, a problem with unmodified polysaccharides is that since they do not have water resistance, cosmetics come off or are deteriorated by sweat or moisture. Therefore, there has been a demand for silicone-modified polysaccharides that can be blended in the aqueous phase and that have excellent water resistance and oil resistance. In addition, the environment surrounding raw materials for cosmetics in recent years has led to a growing need for naturally derived raw materials and biodegradable raw materials that decompose in the natural world from the viewpoint of sustainability.

The present invention has been made in view of the above-described problems, and one of the objects of the present invention is to provide a cosmetic composition that comprises water-soluble silicone-modified polysaccharides and water, is capable of being blended in an aqueous phase of an emulsion, and improves the feeling during use, such as oiliness and stickiness. Furthermore, another object of the present invention is to provide a cosmetic composition that has water resistance and oil resistance, has excellent makeup durability, and does not come off with water but can be removed with warm water.

Means for Solving the Problems

As a result of diligent studies to improve the feeling during use and usability of cosmetics, the present inventor has found that a silicone-modified polysaccharide with a controlled silicone modified ratio has excellent biodegradability, good water repellency, and good oil repellency, is blended in aqueous cosmetics and provides a cosmetic composition having a refreshing feeling. That is, the present invention has found that a cosmetic composition comprising a silicone-modified polysaccharide having at least one silicone residue represented by the following general formula (1), wherein an average number of the silicone residues bonded to one mol of a monosaccharide unit is 0.1 mol or less, is not oily or sticky, has water resistance and oil resistance, has excellent makeup durability, and is removed with walla water while not coming off with water, and thus, the present invention has been achieved. This cosmetic composition not only has a pleasant feeling during use and no stickiness or oiliness, but also has excellent durability. In addition, the present inventor has found that silicone-modified polysaccharides having such a low modified ratio and water solubility serve as a water thickening agent and have an effect of stabilizing cosmetics.

Thus, the present invention provides a cosmetic composition comprising the following components (A) and (B):
(A) a silicone-modified polysaccharide comprising one or more silicone residues bonded to a hydroxyl group in a monosaccharide unit of the polysaccharide, the silicone residues being represented by the following general formula (1):

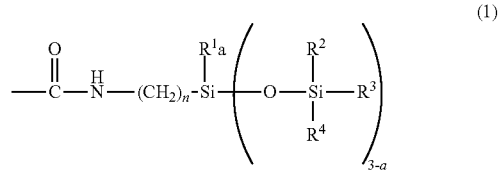

wherein $R^1$, $R^2$, $R^3$ and $R^4$ are, independently of each other, groups selected from an alkyl group having 1 to 8 carbon atoms, a cycloalkyl group having 3 to 8 carbon atoms, a fluorine-substituted alkyl group having 1 to 8 carbon atoms, an aryl group having 6 to 12 carbon atoms, and an aralkyl group having 7 to 12 carbon atoms; n is an integer of 1 to 10; and a is an integer of 0 to 3,
and having an average number of the silicone residues bonded to one mol of the monosaccharide unit of 0.001 mol or more and 0.1 mol or less, in an amount of 0.05% to 20% by mass, based on a total mass of the cosmetic composition, and (B) water in an amount of 5% to 99% by mass, based on the total mass of the cosmetic composition.

Effects of the Invention

The present invention provides a cosmetic composition that is not oily or sticky, has water resistance and oil resistance, has excellent makeup durability, and does not come off with water but can be removed with warm water. In particular, the present invention provides a cosmetic composition in the faun of an emulsion and the cosmetic composition suitable as a makeup primer, a liquid foundation, a sun blocking milky lotion, and a sun blocking cream.

BRIEF DESCRIPTION OF THE DRAWINGS

FIG. 1 is a graph illustrating degrees of biodegradation (%) of silicone-modified pullulan of Synthesis Example 1, unmodified pullulan, and silicone-modified pullulan of Comparative Synthesis Example 1.

MEANS FOR SOLVING THE PROBLEMS

The following describes the present invention in more detail.

The present invention provides a cosmetic composition comprising the following components (A) and (B).

(A) a silicone-modified polysaccharide comprising one or more silicone residues bonded to a hydroxyl group in a monosaccharide unit of the polysaccharide, the silicone residues being represented by the following general formula (1):

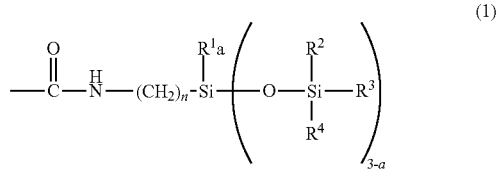

wherein $R^1$, $R^2$, $R^3$ and $R^4$ are, independently of each other, groups selected from an alkyl group having 1 to 8 carbon atoms, a cycloalkyl group having 3 to 8 carbon atoms, a fluorine-substituted alkyl group having 1 to 8 carbon atoms, an aryl group having 6 to 12 carbon atoms, and an aralkyl group having 7 to 12 carbon atoms; n is an integer of 1 to 10; and a is an integer of 0 to 3, and having an average number of the silicone residues bonded to one mol of the monosaccharide unit of 0.001 mol or more and 0.1 mol or less, in an amount of 0.05% to 20% by mass, based on a total mass of the cosmetic composition, and (B) water in an amount of 5% to 99% by mass, based on the total mass of the cosmetic composition.

The above-described silicone-modified polysaccharides are water-soluble and can be contained in an aqueous phase of an emulsion.

Component (A) is the silicone-modified polysaccharide that has one or more silicone residues bonded to the hydroxyl group in the monosaccharide unit of the polysaccharide and represented by the following general formula (1):

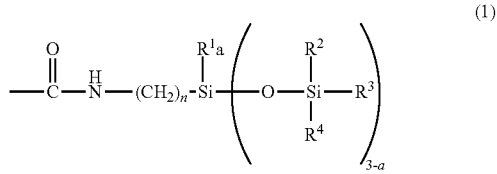

wherein $R^1$, $R^2$, $R^3$ and $R^4$ are, independently of each other, groups selected from an alkyl group having 1 to 8 carbon atoms, a cycloalkyl group having 3 to 8 carbon atoms, a fluorine-substituted alkyl group having 1 to 8 carbon atoms, an aryl group having 6 to 12 carbon atoms, and an aralkyl group having 7 to 12 carbon atoms; n is an integer of 1 to 10; and a is an integer of 0 to 3.

Component (A) has an average number of the silicone residues bonded to one mol of the monosaccharide unit of 0.001 mol or more and 0.1 mol or less.

Any known polysaccharides can be used as the above-described polysaccharide. Examples include pullulan, cellulose, chitin, chitosan, starch, mannan, hyaluronic acid, and derivatives thereof. Examples of the derivatives include a methylated derivative, an ethylated derivative, an added derivative of oxyalkylene such as ethylene oxide and propylene oxide, an acylated derivative, and a cationized derivative. Among them, pullulan and cellulose are preferable, and pullulan is more preferable. A weight average molecular weight of the polysaccharide is preferably 1,000 to 5,000,000, and more preferably 30,000 to 400,000. The weight average molecular weight is measured by, for example, gel permeation chromatography (GPC) analysis (solvent: DMF, pullulan conversion, 25° C.).

In the formula (1), $R^1$, $R^2$, $R^3$ and $R^4$ are, independently of each other, groups selected from an alkyl group having 1 to 8 carbon atoms, a cycloalkyl group having 3 to 8 carbon atoms, a fluorine-substituted alkyl group having 1 to 8 carbon atoms, an aryl group having 6 to 12 carbon atoms, and an aralkyl group having 7 to 12 carbon atoms. Examples of the group include an alkyl group such as a methyl group, an ethyl group, a propyl group, a butyl group, a pentyl group, a hexyl group, a heptyl group, and an octyl group; a cycloalkyl group such as a cyclopentyl group and a cyclohexyl group; an aryl group such as a phenyl group and a tolyl group; an aralkyl group such as a benzyl group and a phenethyl group; a fluorine-substituted alkyl group such as a trifluoropropyl group and a heptadecafluorodecyl group. The alkyl group or the phenyl group having 1 to 8 carbon atoms is preferable, and the methyl group is more preferable.

n is an integer of 1 to 10, preferably an integer of 2 to 8, more preferably an integer of 3 to 6, and most preferably 3. a is an integer of 0 to 3.

In the silicone-modified polysaccharide, the average number of the silicone residues bonded to one mol of the monosaccharide unit is 0.1 mol or less, preferably less than 0.1 mol, more preferably 0.09 mol or less, and still more preferably 0.08 mol or less. If the average number of the silicone residues bonded to one mol of the monosaccharide exceeds the above-described upper limit value, it is difficult for the cosmetic composition obtained using the silicone-modified polysaccharide to have sufficient water repellency and oil repellency, and the silicone-modified polysaccharide may not be blended in aqueous cosmetics. Further, a cosmetic composition having a refreshing feeling may not be obtained. While a lower limit value is not specifically limited, it may be, for example, 0.001 mol or more, is preferably 0.005 mol or more, and is more preferably 0.01 mol or more. The average number of the bonded silicone residues may be determined by analyzing a reaction product using $^1$H-NMR.

As described above, a more preferred aspect is silicone-modified pullulan in which the polysaccharide is pullulan. In this case, the average number of the silicone residues bonded to one mol of a glucose unit is 0.1 mol or less, preferably less than 0.1 mol, more preferably 0.09 mol or less, and further preferably 0.08 mol or less. As described above, the lower limit value may be 0.001 mol or more, preferably 0.005 mol or more, and more preferably 0.01 mol or more.

The silicone-modified polysaccharide represented by the general formula (1) is obtained by a urethane bond formation reaction between the hydroxyl group that the above-described polysaccharide has and the silicone having an isocyanate group. The silicone having the isocyanate group is represented by the following formula:

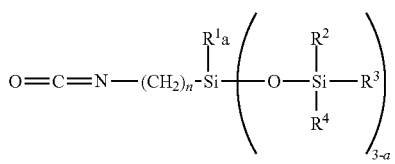

wherein $R^1$ to $R^4$, n and a are as described above.

For example, the silicone includes compounds represented by the following formulas.

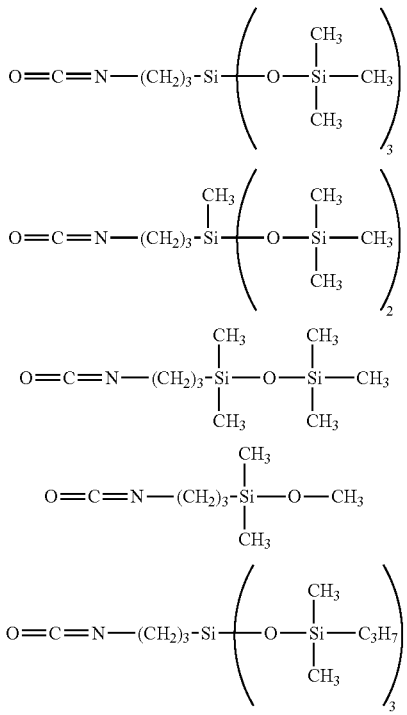

-continued

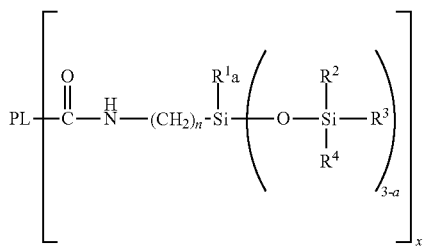

As described above, the silicone-modified polysaccharide of the present invention is prepared by the urethane bond formation reaction between the hydroxyl group of the polysaccharide compound and the silicone having the isocyanate group. In such a reaction, it is preferable to use a solvent from the viewpoint of improving reaction efficiency and controlling the reaction. Examples of the solvent used in the reaction include an ester such as butyl acetate; a ketone such as a methyl ethyl ketone, a methyl isobutyl ketone, and cyclohexanone; an aromatic hydrocarbon such as toluene and xylene; an ether such as a dibutyl ether, tetrahydrofuran, and dioxane; and an amide such as N, N-dimethylformamide and N-methylpyrrolidone. These may be used alone or in a combination of two or more.

As for a blending ratio of the isocyanate compound and the polysaccharide, a molar ratio of isocyanate to the hydroxyl group per monosaccharide (for example, glucose) is 0.001 to 0.12, and preferably 0.005 to 0.10. This allows the silicone-modified polysaccharide (preferably silicone-modified pullulan) having the above-described silicone modified ratio, that is, the average number of the silicone residues bonded to one mol of the monosaccharide unit (preferably glucose) being 0.1 mol or less, to be obtained.

Conditions of urethane bond formation reactions vary depending on the type of solvent used, however they are usually 20° C. to 150° C. and 1 hour to 10 hours. A method for adding the isocyanate compound may be sequential dropping, mixed dropping, or batch addition. As a catalyst, known catalysts used for the urethane bond formation, including amines such as triethylamine, triethylenediamine, and N-methylmorpholin, and organic metal compounds such as di-n-butyltin dilaurate and stannous oleate, may be added. After the reaction is completed, a desired saccharide compound is obtained by washing and drying.

For example, when the polysaccharide is pullulan, the silicone-modified polysaccharide (A) is represented by the following formula.

$$PL - \left[ \overset{O}{\underset{\|}{C}} - \overset{H}{\underset{|}{N}} - (CH_2)_n - \underset{\underset{R^{1}a}{|}}{Si} \left( -O - \underset{\underset{R^4}{|}}{\overset{\overset{R^2}{|}}{Si}} - R^3 \right)_{3-a} \right]_x$$

In the formula, PL is a residue of pullulan, and the silicone is bonded to the hydroxyl group in the glucose unit of pullulan. x is a value in which the average number of the bonded silicone residues is in the above-described range.

The cosmetic composition of the present invention comprises the silicone-modified polysaccharide (A) and water (B). An amount of component (A) in the cosmetic composition is suitably in the range of 0.05% to 20% by mass, and preferably in the range of 0.1% to 10% by mass, based on the total amount of cosmetic composition. An amount of water (B) is suitably in the range of 5% to 99% by mass, and preferably in the range of 10% to 90% by mass, based on the total amount of cosmetic composition.

The silicone-modified polysaccharide (A) of the present invention has biodegradability. A method described in the OECD Guidelines, a method specified by the ISO, and a method specified in the JIS may be used to test biodegradability. OECD 301 A to F, OECD 302, OECD 306, ISO 14855, ISO 14851, and ISO 17556 are given as examples. In the present invention, biodegradability was evaluated by the method described in OECD 301F.

The silicone-modified polysaccharide (A) of the present invention is water-soluble; that is, it has the property of being soluble in water. Accordingly, the cosmetic composition of the present invention may be used as the emulsion comprising the silicone-modified polysaccharides in the aqueous phase. In particular, the silicone-modified polysaccharide of the present invention swells in water at room temperature (25° C.±5° C.) or lower, and dissolves in water at 30° C. or higher, for example, at about 30° C. to 80° C. Even when it is once dissolved in water and then cooled to about room temperature (25° C.±5° C.), the state of being dissolved in water is maintained.

Accordingly, it is possible to provide cosmetics that do not come off with water at room temperature or lower and can be washed off with warm water.

The cosmetic composition of the present invention preferably further contains one or more hydrophilic substances selected from propylene glycol, trimethylene glycol, dipropylene glycol, 1,3-butylene glycol, methylpropanediol, pentylene glycol, glycerol, diglycerol, ethylhexyl glycerol, triglycerol and polyglycerol, and ethanol.

The cosmetic composition of the present invention can further contain silicone oil, hydrocarbon oil, and ester oil. Examples of the silicone oil include linear or branched organopolysiloxanes of low viscosity to high viscosity such as dimethylpolysiloxane, tristrimethylsiloxymethylsilane, caprylylmethicone, phenyltrimethicone, tetrakistrimethylsiloxysilane, methyiphenylpolysiloxane, methylhexylpolysiloxane, methylhydrogenpolysiloxane, and a dimethylsiloxane-methylphenylsiloxane copolymer. Alternatively, a cyclic organopolysiloxane such as octamethylcyclotetrasiloxane, decamethylcyclopentasiloxane, dodecamethylcyclohexasiloxane, tetramethyltetrahydrogencyclotetrasiloxane, and tetramethyltetraphenylcyclotetrasiloxane; an amino-modified organopolysiloxane; a pyrrolidone-modified organopolysiloxane; a pyrrolidone carboxylic acid-modified organopolysiloxane; a silicone rubber such as a highly polymerized gum-like dimethylpolysiloxane, a gum-like amino-modified organopolysiloxane, and a gum-like dimethylsiloxane methylphenylsiloxane copolymer; and a cyclic organopolysiloxane solution of silicone gum or rubber are given as examples. Examples of the hydrocarbon oil include linear, branched, and volatile hydrocarbon oils. These include ozokerite, an α-olefin oligomer, light isoparaffin, isododecane, isohexadecane, light liquid isoparaffin, squalane, synthetic squalane, vegetable squalane, squalene, ceresine, paraffin, paraffin wax, polyethylene wax, polyethylene-polypropylene wax, a (ethylene/propylene/styrene) copolymer, a (butylene/propylene/styrene) copolymer, liquid paraffin, liquid isoparaffin, pristane, polyisobutylene, hydrogenated polyisobutene, microcrystalline wax, and Vaseline. Examples of the higher fatty acid include lauric acid, myristic acid, palmitic acid, stearic acid, behenic acid, undecylenic acid, oleic acid, linoleic acid, linolenic acid, arachidonic acid, eicosapentaenoic acid (EPA), docosahexaenoic acid (DHA), isostearic acid, and 12-hydroxystearic acid. Examples of the ester oil include diisobutyl adipate, 2-hexyldecyl adipate, di-2-heptylundecyl adipate, N-alkylglycol monoisostearate, isocetyl isostearate, trimethylolpropane triisostearate, ethylene glycol di-2-ethylhexanoate, cetyl 2-ethylhexanoate, trimethylolpropane tri-2-ethylhexanoate, pentaerythritol tetra-2-ethylhexanoate, cetyl octanoate, an octyldodecyl gum ester, oleyl oleate, octyldodecyl oleate, decyl oleate, neopentyl glycol dioctanoate, neopentyl glycol dicaprate, triethyl citrate, 2-ethylhexyl succinate, amyl acetate, ethyl acetate, butyl acetate, isocetyl stearate, butyl stearate, diisopropyl sebacate, di-2-ethylhexyl sebacate, cetyl lactate, myristyl lactate, isononyl isononanoate, isotridecyl isononanoate, isopropyl palmitate, 2-ethylhexyl palmitate, 2-hexyldecyl palmitate, 2-heptylundecyl palmitate, cholesteryl 12-hydroxystearate, a dipentaerythritol fatty acid ester, isopropyl myristate, octyldodecyl myristate, 2-hexyldecyl myristate, myristyl myristate, hexyldecyl dimethyloctanoate, ethyl laurate, hexyl laurate, an N-lauroyl-L-glutamic acid-2-octyldodecyl ester, a lauroyl sarcosine isopropyl ester, and diisostearyl malate. Examples of the glyceride oil include acetoglyceryl, glyceryl triisooctanoate, glyceryl triisostearate, glyceryl triisopalmitate, glyceryl tribehenate, glyceryl monostearate, glyceryl di-2-heptylundecanoate, glyceryl trimyristate, and diglyceryl myristyl isostearate.

The cosmetic composition of the present invention may further contain one or more oils in accordance with the purpose. Any solid, semi-solid, or liquid oil may be used as long as it is used in the general cosmetics. Examples of natural animal and vegetable fats and oils and semisynthetic fats and oils include avocado oil, linseed oil, almond oil, insect wax, perilla oil, olive oil, cacao butter, kapok wax, kaya oil, carnauba wax, liver oil, candelilla wax, purified candelilla wax, beef tallow, beef foot fat, beef bone fat, hardened beef tallow, apricot kernel oil, whale wax, hardened oil, wheat germ oil, sesame oil, rice germ oil, rice bran oil, sugarcane wax, Camellia sasanqua oil, safflower oil, rhea butter, Chinese tung oil, cinnamon oil, jojoba wax, squalane, squalene, shellac wax, turtle oil, soybean oil, tea seed oil, camellia oil, evening primrose oil, corn oil, lard, rapeseed oil, Japanese tung oil, bran wax, gem), oil, horse fat, persic oil, palm oil, palm kernel oil, castor oil, hardened castor oil, castor oil fatty acid methyl esters, sunflower oil, grape oil, bayberry wax, jojoba oil, macadamia nut oil, beeswax, mink oil, meadowfoam oil, cottonseed oil, cotton wax, Japan wax, Japan wax kernel oil, montan wax, coconut oil, hardened coconut oil, tri-coconut oil fatty acid glycerides, mutton tallow, peanut oil, lanolin, liquid lanolin, reduced lanolin, lanolin alcohol, hard lanolin, acetylated lanolin, acetylated lanolin alcohol, lanolin fatty acid isopropyl, POE lanolin alcohol ether, POE lanolin alcohol acetate, lanolin fatty acid polyethylene glycol, POE hydrogenated lanolin alcohol ether, and egg yolk oil. Note that POE denotes polyoxyethylene (the same applies hereinafter).

Examples of a higher alcohol include lauryl alcohol, myristyl alcohol, palmityl alcohol, stearyl alcohol, behenyl alcohol, hexadecyl alcohol, oleyl alcohol, isostearyl alcohol, hexyldodecanol, octyldodecanol, cetostearyl alcohol, 2-decyltetradecynol, cholesterol, phytosterol, POE cholesterol ether, monostearyl glycerol ether (batyl alcohol), and monooleyl glyceryl ether (selachyl alcohol).

An amount of these oils varies depending on the agent system, however the range of 1% to 60% by mass, based on a total amount of the cosmetic composition is suitable.

In the cosmetic composition of the present invention, one or more compounds having an alcoholic hydroxyl group in the molecular structure may also be blended in accordance with the purpose. Examples of the compound having the alcoholic hydroxyl group, other than the above-described hydrophilic substances, include a sugar alcohol such as sorbitol and maltose, and a sterol such as cholesterol, sitosterol, phytosterol, and lanosterol. An amount in the range of 0.1% to 98% by mass, based on the total amount of the cosmetic composition is suitable, with the range of 0.2% to 10% by mass particularly preferable.

In the cosmetic composition of the present invention, one or more water-soluble or water-swellable polymers may also be used in accordance with the purpose. Examples are a plant-based polymer such as gum arabic, tragacanth, galactan, carob gum, guar gum, karaya gum, carrageenan, pectin, agar, quince seed (marmelo), starch (rice, corn, potato, and wheat), algae colloid, trant gum, and locust bean gum; a microorganism-based polymer such as xanthan gum, dextran, succinoglucan, and pullulan; an animal-based polymer such as collagen, casein, albumin, and gelatin; a starch-based polymer such as carboxymethyl starch and methylhydroxypropyl starch; a cellulose-based polymer such as methyl cellulose, ethyl cellulose, methylhydroxypropyl cellulose, carboxymethyl cellulose, hydroxymethyl cellulose, hydroxypropyl cellulose, nitrocellulose, sodium cellulose sulfate, sodium carboxymethyl cellulose, crystalline cellulose, and cellulose powder; an alginic acid-based polymer such as sodium alginate and alginic acid propylene glycol esters; a vinyl-based polymer such as polyvinyl methyl ether and a carboxy vinyl polymer; a polyoxyethylene-based polymer; a polyoxyethylene polyoxypropylene copolymer-based polymer; an acrylic-based polymer such as sodium polyacrylate, polyethyl acrylate, polyacrylamide, and an acryloyldimethyltaurine salt copolymer; another synthetic water-soluble polymer such as polyethyleneimine and a cationic polymer; an inorganic-based water-soluble polymer such as bentonite, magnesium aluminum silicate, montmorillonite, beidellite, nontronite, saponite, hectorite, and silicic anhydride. In addition, these water-soluble polymers also contain a film-forming agent such as polyvinyl alcohol and polyvinylpyrrolidone. An amount in the range of 0.1% to 25% by mass, based on the total amount of the cosmetic composition is suitable.

In the cosmetic composition of the present invention, one or more powders and/or colorants may also be used according to the purpose. Any material may be used as the powder regardless of shape (spherical, needle-shaped, and plate-shaped), particle diameter (fumes, fine particles, and pigment grade), or particle structure (porous and non-porous), as long as it is used in ordinary cosmetic compositions, and examples of the powder include an inorganic powder, an organic powder, a surfactant metal salt powder, a colored pigment, a pearl pigment, a metal powder pigment, a tar pigment and a natural pigment.

Examples of the inorganic powder include titanium oxide, zirconium oxide, zinc oxide, cerium oxide, magnesium oxide, barium sulfate, calcium sulfate, magnesium sulfate, calcium carbonate, magnesium carbonate, talc, mica, kaolin, sericite, muscovite, synthetic mica, phlogopite, lepidolite, biotite, lithia mica, silicic acid, silicic anhydride, aluminum silicate, magnesium silicate, magnesium aluminum silicate, calcium silicate, barium silicate, strontium silicate, metal tungstate, hydroxyapatite, vermiculite, Higilite, bentonite, montmorillonite, hectorite, zeolite, ceramic powder, dibasic calcium phosphate, alumina, aluminum hydroxide, boron nitride, and silica.

Examples of the organic powder include polyamide powder, polyester powder, polyethylene powder, polypropylene powder, polystyrene powder, polyurethane, benzoguanamine powder, polymethylbenzoguanamine powder, tetrafluoroethylene powder, polymethyl methacrylate powder, cellulose, silk powder, nylon powder, 12 nylon, 6 nylon, silicone powder, styrene-acrylic acid copolymers, divinylbenzene styrene copolymers, vinyl resin, urea resin, phenol resin, fluorine resin, silicon resin, acrylic resin, melamine resin, epoxy resin, polycarbonate resin, microcrystalline fiber powder, starch powder, and lauroyl lysine.

Examples of the surfactant metal salt powder (metallic soap) include zinc stearate, aluminum stearate, calcium stearate, magnesium stearate, zinc myristate, magnesium myristate, zinc cetyl phosphate, calcium cetyl phosphate and zinc sodium cetyl phosphate.

Examples of the colored pigment include an inorganic red pigment such as iron oxide, iron hydroxide, and iron titanate; an inorganic brown pigment such as γ-iron oxide; an inorganic yellow pigment such as yellow iron oxide and loess; an inorganic black pigment such as black iron oxide and carbon black; an inorganic violet pigment such as manganese violet and cobalt violet; an inorganic green pigment such as chromium hydroxide, chromium oxide, cobalt oxide, and cobalt titanate; an inorganic blue pigment such as Prussian blue and ultramarine blue; a pigment obtained by laking a tar pigment; a pigment obtained by laking a natural pigment; and a synthetic resin powder obtained by combining these powders.

Examples of the pearl pigment include titanium oxide-coated mica, titanium oxide-coated mica, bismuth oxychloride, titanium oxide-coated bismuth oxychloride, titanium oxide-coated talc, fish scale foil, and titanium oxide-coated coloring mica.

Examples of the metal powder pigment include aluminum powder, copper powder and stainless powder.

Examples of the tar pigment include red No. 3, red No. 104, red No. 106, red No. 201, red No. 202, red No. 204, red No. 205, red No. 220, red No. 226, red No. 227, red No. 228, red No. 230, red No. 401, red No. 505, yellow No. 4, yellow No. 5, yellow No. 202, yellow No. 203, yellow No. 204, yellow No. 401, blue No. 1, blue No. 2, blue No. 201, blue No. 404, green No. 3, green No. 201, green No. 204, green No. 205, orange No. 201, orange No. 203, orange No. 204, orange No. 206 and orange No. 207.

Examples of the natural pigment include carminic acid, laccaic acid, carthamin, brazilin and crocin.

Among these powders, those in which powders are combined, or those treated with a general oil, a silicone oil, a fluorine compound and a surfactant may also be used, and one or more of those treated with a hydrolysable silyl group or an alkyl group having a hydrogen atom directly bonded to a silicon atom, a linear and/or branched organopolysiloxane having a hydrolysable silyl group or a hydrogen atom directly bonded to a silicon atom, a linear and/or branched organopolysiloxane having a hydrolysable silyl group or a hydrogen atom directly bonded to a silicon atom and being co-modified by a long chain alkyl, a linear and/or branched organopolysiloxane having a hydrolysable silyl group or a hydrogen atom directly bonded to a silicon atom and being co-modified by polyoxyalkylene, and an acrylic-silicone-based copolymer having a hydrolysable silyl group or a hydrogen atom directly bonded to a silicon atom may also be used as necessary.

An amount of the powder and/or the colorant in the range of 0.1% to 99%, based on the total amount of the cosmetic composition is suitable, with the range of 1.0% to 20.0% by mass particularly preferable.

In the cosmetic composition of the present invention, one or more surfactants may also be used in accordance with the purpose. Examples of such a surfactant are anionic, cationic, nonionic and amphoteric active agents, however this is not particularly limited, and any material may be used as long as it is used in ordinary cosmetics.

Examples of the anionic surfactant include a fatty acid soap such as sodium stearate and triethanolamine palmitate, an alkyl ether carboxylic acid and a salt thereof, a salt of a condensate of an amino acid and a fatty acid, an alkane sulfonic acid salt, an alkene sulfonic acid salt, a fatty acid ester sulfonic acid salt, a fatty acid amide sulfonic acid salt, a formalin condensation-based sulfonic acid salt, an alkyl sulfuric acid ester salt, a secondary higher alcohol sulfuric acid ester salt, an alkyl and allyl ether sulfuric acid ester salt, a sulfuric acid ester salt of a fatty acid ester, a sulfuric acid ester salt of a fatty acid alkylol amide, a sulfuric acid ester salt such as turkeyred oil, an alkyl phosphoric acid salt, an ether phosphoric acid salt, an alkyl aryl ether phosphoric acid salt, an amide phosphoric acid salt, an N-acyl lactic acid salt, an N-acyl sarcosine salt, and an N-acyl amino acid-based active agent, and examples of the cationic surfactant include an amine salt such as an alkylamine salt, a polyamine, and an aminoalcohol fatty acid derivative, an alkyl quaternary ammonium salt, an aromatic quaternary ammonium salt, a pyridinium salt, and an imidazolium salt.

Examples of the nonionic surfactant include a sorbitan fatty acid ester, a glycerol fatty acid ester, a polyglycerol fatty acid ester, a propylene glycol fatty acid ester, a polyethylene glycol fatty acid ester, a sucrose fatty acid ester, a methyl glucoside fatty acid ester, an alkyl polyglucoside, a polyoxyethylene alkyl ether, a polyoxypropylene alkyl ether, a polyoxyethylene alkyl phenyl ether, a polyoxyethylene fatty acid ester, a polyoxyethylene sorbitan fatty acid ester, a polyoxyethylene sorbitol fatty acid ester, a polyoxyethylene glycerol fatty acid ester, a polyoxyethylene propylene glycol fatty acid ester, polyoxyethylene castor oil, polyoxyethylene hardened castor oil, a polyoxyethylene phytostanol ether, a polyoxyethylene phytosterol ether, a polyoxyethylene cholestanol ether, polyoxyethylene cholesteryl ether, a linear or branched polyoxyalkylene-modified organopolysiloxane, a linear or branched polyoxyalkylene alkyl-co-modified organopolysiloxane, a linear or branched polyglycerol-modified organopolysiloxane, a linear or branched polyglycerol alkyl-co-modified organopolysiloxane, alkanol amide, sugar ether, and sugar amide, and examples of the amphoteric surfactant include betaine, phosphatidylcholine, an aminocarboxylic acid salt, an imidazoline derivative, and an amideamine type.

Among these surfactants, a linear or branched organopolysiloxane having a polyoxyalkylene chain or a polyglycerol chain in the molecule is preferred, with a linear or branched organopolysiloxane having a long chain alkyl group having 6 to 20 carbon atoms more preferable. In these surfactants, a content of a hydrophilic polyoxyalkylene group or a polyglycerol residue preferably occupies 10% to 70% by mass of the molecule. An amount in the range of 0.1% to 20% by mass, based on the total amount of the cosmetic composition is suitable, with the range of 0.2% to 10% by mass particularly preferable.

The cosmetic composition of the present invention may also contain one or more silicone resins in accordance with the purpose. The silicone resin is preferably an acrylic silicone resin of an acrylic/silicone graft or a block copolymer. In addition, an acrylic silicone resin comprising at least one selected from an anion moiety such as a pyrrolidone moiety, a long chain alkyl moiety, a polyoxyalkylene moiety, a fluoroalkyl moiety, and carboxylic acid in the molecule may also be used.

Further, this silicone resin is preferably a silicone network compound comprising a resin composed of a $R^{1s}_3SiO_{0.5}$ unit and a $SiO_2$ unit; a resin composed of a $R^{1s}_3SiO_{0.5}$ unit, a $R^{1s}_2SiO$ unit, and a $SiO_2$ unit; a resin composed of a $R^{1s}_3SiO_{0.5}$ unit and a $R^{1s}SiO_{1.5}$ unit; a resin composed of a $R^{1s}_3SiO_{0.5}$ unit, a $R^{1s}_2SiO$ unit, and a $R^{1s}SiO_{1.5}$ unit; and a resin composed of a $R^{1s}_3SiO_{0.5}$ unit, a $R^{1s}_2SiO$ unit, a $R^{1s}SiO_{1.5}$ unit, and a $SiO_2$ unit ($R^{1s}$ indicates an organic group). In addition, a silicone network compound comprising at least one selected from a pyrrolidone moiety, a long chain alkyl moiety, a polyoxyalkylene moiety, a fluoroalkyl moiety, and an amino moiety in the molecule may also be used. In the case of using a silicone resin such as an acrylic silicone resin and a silicone network compound, an amount is preferably 0.1% to 20% by mass, further preferably 1% to 10% by mass, based on the total amount of the cosmetic composition.

The cosmetic composition of the present invention may also contain a composition comprising one or more crosslinked organopolysiloxanes and an oil that is liquid at room temperature in accordance with the purpose. It is preferable that the crosslinked organopolysiloxane contains the liquid oil in an amount equal to its own weight or more to swell, in relation to the liquid oil. The above-described liquid silicone oil, a hydrocarbon oil, an ester oil, a natural animal and vegetable oil, a semisynthetic oil, and a fluorine-based oil may be used as the liquid oil, and examples of the liquid oil include a low viscosity silicone oil with a viscosity of 0.65 mm$^2$/sec (25° C.) to 100.0 mm$^2$/sec (25° C.); a hydrocarbon oil such as liquid paraffin, squalane, isododecane, and isohexadecane; a glyceride oil such as trioctanoin; an ester oil such as isotridecyl isononanoate, an N-acylglutamic acid ester, and a lauroyl sarcosinic acid ester; and a natural animal and vegetable oil such as a macadamia nut oil. In addition, a crosslinking agent for obtaining the crosslinked organopolysiloxane preferably has two or more vinylic reactive sites in the molecule and forms a crosslinked structure by reacting with a hydrogen atom directly bonded to a silicon atom. Examples of the crosslinking agent having two or more vinylic reactive sites in the molecule include an organopolysiloxane having two or more vinyl groups in the molecule, a polyoxyalkylene having two or more allyl groups in the molecule, a polyglycerol having two or more allyl groups in the molecule, and α, ω-alkenyldiene.

In addition, a crosslinked organopolysiloxane comprising at least one selected from the group consisting of a polyoxyalkylene moiety, a polyglycerol moiety, a long chain alkyl moiety, an alkenyl moiety, an aryl moiety, and a fluoroalkyl moiety in the crosslinking molecule may also be used. In the case of using the composition composed of the crosslinked organopolysiloxane and the oil that is liquid at room temperature, an amount of the composition is preferably 0.1% to 80% by mass, further preferably 1% to 50% by mass, based on the total amount of the cosmetic composition.

In the cosmetic composition of the present invention, one or more silicone waxes may also be comprised in accordance with the purpose. The silicone wax is a silicon-modified olefin wax obtained by subjecting an olefin wax having an unsaturated group consisting of an α-olefin and a diene, in addition to an organohydrogenpolysiloxane having one or more SiH bonds in one molecule, to an addition reaction. Examples of the α-olefin of the olefin wax having a carbon number of 2 to 12 preferably includes ethylene, propylene, 1-butene, 1-hexene, 4-methyl-1-pentene. Butadiene, isoprene, 1,4-hexadiene, vinyl norbornene, ethylidene norbornene, and dicyclopentadiene are preferred as the diene. As the organohydrogenpolysiloxane having a SiH bond may have a linear structure or a siloxane branched structure. In the case of using a silicone wax, an amount of the wax is preferably 0.1% to 20% by mass, further preferably 0.5% to 10% by mass, based on the total amount of the cosmetic composition.

Further, a component used in ordinary cosmetic compositions, for example, an oil-soluble gelling agent, a resin, an antiperspirant, an ultraviolet absorber, an ultraviolet absorptive scattering agent, a hydrating agent, an antimicrobial preservative, an antimicrobial agent, a perfume, salts, an antioxidant, a pH adjuster, a chelating agent, a refrigerant, an anti-inflammatory agent, a skin beautifying ingredient (a whitening agent, a cell activator, a rough skin improving agent, a blood circulation promoter, a skin astringent, and an antiseborrheic drug), vitamins, amino acids, nucleic acid, a hormone, an inclusion compound, and a solidifying agent for hair may be added to the cosmetic composition of the present invention.

Examples of the oil-soluble gelling agent include a gelling agent selected from a metallic soap such as aluminum stearate, magnesium stearate, and zinc myristate; an amino acid derivative such as N-lauroyl-L-glutamic acid and α,γ-di-n-butylamine; a dextrin fatty acid ester such as a dextrin palmitic acid ester, a dextrin stearic acid ester, and a dextrin 2-ethylhexanoic acid/palmitic acid ester; a sucrose fatty acid ester such as a sucrose palmitic acid ester and a sucrose stearic acid ester; a fructo-oligosaccharide fatty acid ester such as a fructo-oligosaccharide stearic acid ester and a fructo-oligosaccharide 2-ethylhexanoic acid ester; a benzylidene derivative of sorbitol such as monobenzylidene sorbitol and dibenzylidene sorbitol; an organically modified clay mineral such as dimethylbenzyldodecylammonium montmorillonite clay and dimethyldioctadecylammonium montmorillonite clay.

Examples of the antiperspirant include aluminum chlorohydrate, aluminum chloride, aluminum sesquichlorohydrate, zirconyl hydroxychloride, aluminum zirconium hydroxychloride, and aluminum zirconium glycine complex.

Examples of the ultraviolet absorber include a benzoic acid-based ultraviolet absorber such as para-aminobenzoic acid; an anthranilic acid-based ultraviolet absorber such as methyl anthranilate; a salicylic acid-based ultraviolet absorber such as methyl salicylate, octyl salicylate, and trimethylcyclohexyl salicylate; a cinnamic acid-based ultraviolet absorber such as octyl para-methoxycinnamate; a benzophenone-based ultraviolet absorber such as 2,4-dihydroxybenzophenone; an urocanic acid-based ultraviolet absorber such as ethyl urocanate; a dibenzoylmethane-based ultraviolet absorber such as 4-t-butyl-4'-methoxy-dibenzoylmethane; phenylbenzimidazole sulfonic acid; and a triazine derivative. Examples of the ultraviolet absorptive scattering agent include a powder that absorbs or scatters ultraviolet rays such as fine particulate titanium oxide, fine particulate iron-containing titanium oxide, fine particulate zinc oxide, fine particulate cerium oxide, and a composite thereof. A dispersion in which these powders that absorb or scatter ultraviolet rays are preliminarily dispersed in an oil can also be used.

Examples of the hydrating agent include sorbitol, glucose, xylitol, maltitol, polyethylene glycol, hyaluronic acid, chondroitin sulfate, pyrrolidone carboxylate, polyoxyethylene methyl glucoside, polyoxypropylene methyl glucoside, egg yolk lecithin, soybean lecithin, phosphatidyl choline, phosphatidyl ethanolamine, phosphatidyl serine, phosphatidyl glycerol, phosphatidylinositol, and sphingo-phospholipid.

Examples of the antimicrobial preservative include a paraoxybenzoic acid alkyl ester, benzoic acid, sodium benzoate, sorbic acid, potassium sorbate, and phenoxyethanol Examples of the antibacterial agent include benzoic acid, salicylic acid, carbolic acid, sorbic acid, a paraoxybenzoic acid alkyl ester, parachlorometacresol, hexachlorophene, benzalkonium chloride, chlorhexidine chloride, trichlorocarbanilide, a photo sensitizer, and phenoxyethanol.

Examples of the perfume include a natural perfume and a synthetic perfume. Examples of the natural perfume include a vegetable perfume separated from flowers, leaves, wood, and pericarps, and an animal perfume such as musk and civet. Examples of the synthetic perfume includes hydrocarbons such as monoterpene, an alcohol such as aliphatic alcohol and aromatic alcohol, aldehydes such as terpene aldehyde and aromatic aldehyde, ketones such as alicyclic ketones, esters such as terpene-based esters, lactones, phenols, oxides, nitrogen-containing compounds and acetals.

Examples of the salts include an inorganic salt, an organic salt, an amine salt, and an amino acid salt. Examples of the inorganic salt include a sodium salt, a potassium salt, a magnesium salt, a calcium salt, an aluminum salt, a zirconium salt, and a zinc salt of an inorganic acid such as hydrochloric acid, sulfuric acid, carbonic acid, and nitric acid, examples of the organic salt include salts of organic acids such as acetic acid, dehydroacetic acid, citric acid, malic acid, succinic acid, ascorbic acid, and stearic acid, and examples of the amine salt and the amino acid salt include salts of amines such as triethanolamine and salts of amino acids such as glutamic acid. In addition, others including salts of hyaluronic acid, and chondroitin sulfuric acid, an aluminum zirconium glycine complex, and further, an acid-alkali neutralizing salt used in blending cosmetics may also be used.

Examples of the antioxidant include tocopherol, p-t-butylphenol, butylhydroxyanisole, dibutylhydroxytoluene, and phytic acid, examples of the pH adjuster include lactic acid, citric acid, glycolic acid, succinic acid, tartaric acid, dl-malic acid, potassium carbonate, sodium hydrogen carbonate, and ammonium hydrogen carbonate, examples of the chelating agent include alanine, sodium edetate, sodium polyphosphate, sodium metaphosphate, and phosphoric acid, examples of the refrigerant include L-menthol and camphor, and examples of the anti-inflammatory agent include allantoin, glycyrrhizic acid and a salt thereof, glycyrrhetinic acid and stearyl glycyrrhetinate, tranexamic acid, and azulene.

Examples of the skin beautifying ingredient include a whitening agent such as a placenta extract, arbutin, glutathione, and a saxifrage extract; a cell activator or a rough skin improving agent such as a royal jelly, a photosensitizer, a cholesterol derivative, and a bovine blood extract; a blood circulation promoter such as nonylic acid vanillylamide, benzyl nicotinate, β-butoxy-ethyl nicotinate, capsaicin, zingerone, cantharides tincture, ichthammol, caffeine, tannic acid, α-borneol, tocopherol nicotinate, inositol hexanicotinate, cyclandelate, cinnarizine, tolazoline, acetylcholine, verapamil, cepharanthin, and γ-oryzanol; a skin astringent such as zinc oxide and tannic acid; and an antiseborrheic drug such as sulfur and thiantrol.

Examples of the vitamins include vitamins A such as vitamin A oil, retinol, retinol acetate, and retinol palmitate; vitamins B2 such as riboflavin, riboflavin butyrate, and flavin adenine nucleotide; vitamins B6 such as pyridoxine hydrochloride, pyridoxine dioctanoate, and pyridoxine tripalmitate; vitamins B such as vitamin B12 and a derivative thereof, and vitamin B15 and a derivative thereof; vitamins C such as L-ascorbic acid, L-ascorbic acid dipalmitate, L-ascorbic acid-2-sulfate sodium, and L-ascorbic acid phosphate diester dipotassium; vitamins D such as ergocalciferol and cholecalciferol; vitamins E such as α-tocopherol, β-tocopherol, γ-tocopherol, dl-α-tocopherol acetate, dl-α-tocopherol nicotinate, and dl-α-tocopherol succinate; vitamin H; vitamin P; nicotinic acids such as nicotinic acid, benzyl nicotinate, and nicotinic acid amide; pantothenic acids such as calcium pantothenate, D-pantothenyl alcohol, a pantothenyl ethyl ether, and an acetyl pantothenyl ethyl ether; and biotin.

Examples of the amino acids include glycine, valine, leucine, isoleucine, serine, threonine, phenylalanine, arginine, lysine, aspartic acid, glutamic acid, cystine, cysteine, methionine, and tryptophan, examples of the nucleic acid include deoxyribonucleic acid, and examples of the hormone include estradiol and ethenyl estradiol. Examples of the inclusion compound include cyclodextrin.

Examples of the solidifying polymer compound for hair include amphoteric, anionic, cationic, and nonionic polymer compounds, and include a polyvinylpyrrolidone-based polymer compound such as polyvinyl-pyrrolidone and a vinylpyrrolidone/vinyl acetate copolymer, an acidic vinyl ether-based polymer compound such as a methyl vinyl ether/maleic anhydride alkyl half ester copolymer, an acidic polyvinyl acetate-based polymer such as a vinyl acetate/crotonic acid copolymer, an acidic acrylic-based polymer compound such as a (meth)acrylic acid/alkyl (meth)acrylate copolymer and a (meth)acrylic acid/alkyl (meth)acrylate/alkyl acrylamide copolymer, and an amphoteric acrylic-based polymer compound such as an N-methacryloylethyl-N,N-dimethyl-ammonium, α-N-methylcarboxybetaine/alkyl (meth)acrylate copolymer and a hydroxypropyl (meth)acrylate/butylaminoethyl methacrylate/octylamide acrylate copolymer. In addition, a naturally derived polymer compound such as cellulose or a derivative thereof, and keratin and collagen or a derivative thereof can also be suitably used.

Examples of the form of the cosmetic composition in the present invention include a form such as a powdered composition, an oily composition, or a water-in-oil emulsion, an oil-in-water emulsion, a non-aqueous emulsion, and a multi emulsion such as W/O/W type emulsion and O/W/O type emulsion.

In the present invention, examples of the cosmetic composition include a skin care cosmetic such as a skin lotion, a milky lotion, a cream, a cleanser, a face mask, an oil liquid, a massage agent, a beauty essence, a beauty oil, a detergent, a deodorant, a hand cream, a lip cream, and a wrinkle concealer; a makeup cosmetic such as a makeup primer, a concealer, a white face powder, a powder foundation, a liquid foundation, a cream foundation, an oil foundation, a blusher, an eye shadow, a mascara, an eyeliner, an eyebrow powder, and a lipstick; a hair cosmetic such as a shampoo, a conditioner, a hair treatment, and a setting agent; an antiperspirant; an ultraviolet protective cosmetic composition such as an oil sunscreen, a sun blocking milky lotion, and a sun blocking cream.

In particular, those containing water and taking the form of an emulsion are suitable as the makeup primer, the liquid foundation, the sun blocking milky lotion, and the sun blocking cream.

In addition, various forms such as a liquid, a milky liquid, a cream, a solid, a paste, a gel, a powder, a pressed powder, a multi-layered composition, a mousse, a spray, a stick, and a pencil can be selected as the form of these cosmetic compositions.

When the cosmetic composition of the present invention contains a powder, it is preferable that the cosmetic composition takes the form of any of a liquid, a paste, or a solid into which the powder has been dispersed, as this allows for good handleability.

EXAMPLES

The present invention will be explained below in further detail with reference to a series of the Examples and the Comparative Examples, though the present invention is in no way limited by these Examples.

In the following description, pullulan is a product of Hayashibara Co., Ltd. and has a weight average molecular weight of 200,000.

Synthesis Example 1

In a 300 ml reactor, 10 g of pullulan, 100 g of N-methyl pyrrolidone, and 1 g of triethylamine were dissolved by heating at 120° C. Into this reactor was dropped 0.5 g of an isocyanate group-containing organopolysiloxane represented by the following formula (2).

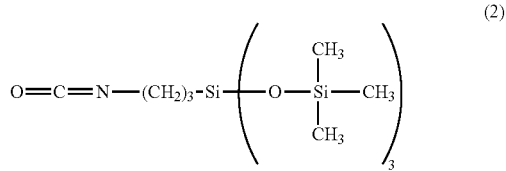

After stirring and reacting at 120° C. for 5 hours, the reaction solution was added into 200 g of acetone while stirring, then a generated precipitate was filtered off, further washed with 200 g of acetone three times, and dried to obtain 8.5 g of a white solid. The obtained white solid was silicone-modified pullulan represented by the following formula (2'):

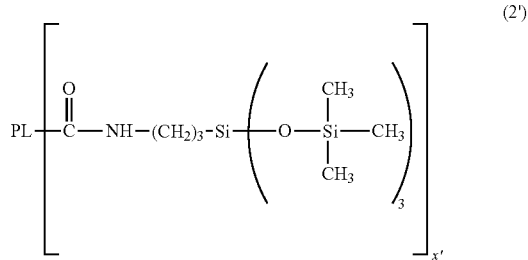

wherein PL is the pullulan residue, and silicone is bonded to a hydroxyl group that was in a glucose unit of pullulan, x' is a value in which an average number of the silicone residues bonded to one mol of a glucose unit is 0.025 mol). According to the result of $^1$H-NMR analysis, the average number of the silicone residues bonded to one mol of the glucose unit was 0.025 mol.

Synthesis Example 2

In a 500 ml reactor, 20 g of pullulan, 200 g of N-methyl pyrrolidone, and 0.5 g of di-n-butyltin dilaurate were dissolved by heating at 120° C. Into this reactor was dropped 3 g of the isocyanate group-containing organopolysiloxane represented by the above-described formula (2). After stirring and reacting at 120° C. for 5 hours, the reaction solution was added into 400 g of acetone while stirring, then a generated precipitate was filtered off, further washed with 200 g of acetone three times, and dried to obtain 19.0 g of a white solid. The obtained white solid was silicone-modified pullulan represented by the above-described formula (2'), and according to the result of $^1$H-NMR analysis, the average number of the silicone residues bonded to one mol of the glucose unit was 0.075 mol. In the above-described formula (2'), x' is a value in which the average number of the silicone residues bonded to one mol of the glucose unit is 0.075 mol.

Synthesis Example 3

In the 500 ml reactor, 10 g of hydroxyethyl cellulose, 150 g of N-methyl pyrrolidone, and 1 g of triethylamine were dissolved by heating at 120° C. Into this reactor was dropped 0.5 g of the isocyanate group-containing organopolysiloxane represented by the above-described formula (2). After stirring and reacting at 120° C. for 3 hours, the reaction solution was added into 400 g of acetone while stirring, then a generated precipitate was filtered off, further washed with 200 g of acetone three times, and dried to obtain 9.2 g of a white solid. The obtained white solid was silicone-modified hydroxyethyl cellulose represented by the following formula (3')

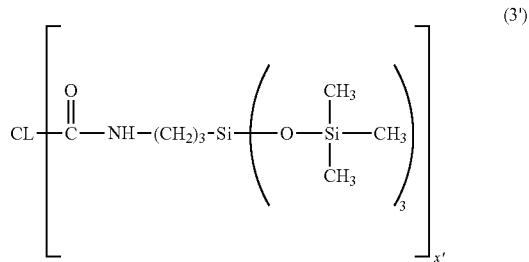

wherein CL is a hydroxyethyl cellulose residue, and silicone is bonded to the hydroxyl group that was in the glucose unit of hydroxyethyl cellulose. x' is a value in which the silicone modified ratio is 0.04 mol of an organopolysiloxane in relation to one mol of the glucose unit), and according to the result of $^1$H-NMR analysis, the average number of the silicone residues bonded to one mol of the glucose unit was 0.04 mol.

Comparative Synthesis Example 1

In the 300 ml reactor, 10 g of pullulan, 100 g of N-methyl pyrrolidone, and 1 g of triethylamine were dissolved by heating at 120° C. Into this reactor was dropped 58 g of the isocyanate group-containing organopolysiloxane represented by the above-described formula (2). After stirring and reacting at 120° C. for 5 hours, the reaction solution was added into 200 g of methanol while stirring, then a generated precipitate was filtered off, further washed with 200 g of methanol three times and dried, then washed with 100 g of water two times and dried to obtain 50 g of a white solid. The obtained white solid was silicone-modified pullulan represented by the above-described formula (2'), and according to the result of $^1$H-NMR analysis, the silicone modified ratio was 1.5 mol of an organopolysiloxane in relation to one mol of the glucose unit. In the above-described formula (2'), x' is a value in which the silicone modified ratio is 1.5 mol of an organopolysiloxane in relation to one mol of the glucose unit.

Biodegradability Test

The silicone-modified pullulan obtained in Synthesis Example 1, the silicone-modified pullulan obtained in Comparative Synthesis Example 1, and the unmodified pullulan used as a raw material in Synthesis Example 1 were used as test samples. In accordance with OECD Guideline No. 301F, Jul. 17, 1992, "Ready Biodegradability: MANOMETRIC RESPIROMETRY TEST", a degree of biodegradation (%) was calculated for each pullulan compound using a measurement method that uses biochemical oxygen demand (BOD) as an index under a culture temperature of 22° C. and using inoculums collected from activated sludge in a sewage treatment plant aerobic reaction tank. A graph of the results is shown in FIG. 1. A determination of easily decomposed is given when the degree of biodegradation after 28 days is 60% or more.

As shown in FIG. 1, the silicone-modified pullulan obtained in Synthesis Example 1 has the largest degree of decomposition and is easily decomposed. While the unmodified pullulan is also easily decomposed, the silicone-modified pullulan of the present invention has a higher degree of biodegradation than that of the unmodified pullulan. In contrast, the silicone-modified pullulan obtained in Comparative Synthesis Example 1 was barely decomposed.

Examples 1 and 2 and Comparative Examples 1 and 2

The silicone-modified pullulan obtained in Synthesis Example 1, the silicone-modified hydroxyethyl cellulose obtained in Synthesis Example 3, the silicone-modified pullulan obtained in Comparative Synthesis Example 1, and the unmodified pullulan, which are as described above, were each mixed with purified water at mass ratios shown in Table 1 below, and solubility of the silicone-modified polysaccharide in purified water at 25° C. and 80° C. and thickening after dissolving the silicone-modified polysaccharide in purified water were evaluated. Further, a presence or absence of stickiness on a dried film obtained by drying the solutions was evaluated based on the following index.

Evaluation Method

Stickiness was evaluated by five panelists. Table 1 shows the average values of the evaluation points of the five panelists, which were scored and obtained according to the following evaluation criteria. Comparative Example 1 was evaluated using a dried film obtained by dissolving in toluene then drying.

Evaluation Criteria 5 points: Not sticky
4 points: Barely sticky
3 points: Slightly sticky
2 points: Sticky
1 point: Very sticky

TABLE 1

|  | pts. mass | Example 1 | Example 2 | Comparative Example 1 | Comparative Example 2 |
|---|---|---|---|---|---|
| 1 | Silicone-modified pullulan of Synthesis Example 1 | 1 | | | |
| 2 | Silicone-modified hydroxyethyl cellulose of Synthesis Example 3 | | 1 | | |
| 3 | Silicone-modified pullulan of Comparative Synthesis Example 1 | | | 1 | |
| 4 | Pullulan | | | | 1 |
| 5 | Purified water | 9 | 9 | 9 | 9 |
| Evaluation | Solubility in purified water, 25° C. | Swelling | Swelling | Insoluble | Soluble |
|  | Solubility in purified water, 80° C. | Soluble | Soluble | Insoluble | Soluble |
|  | Thickening when dissolved in purified water | Gel | Gel | N/A | Liquid |
|  | Stickiness of dried film | 4.6 | 4.4 | 3.0 | 2.2 |

Examples 3 to 6 and Comparative Examples 3 to 5

Cosmetic compositions (lotions) were prepared with the compositions and the formulations shown in the following Table 2 using the silicone-modified polysaccharide obtained in Synthesis Examples 1 to 3 and Comparative Synthesis Example 1, and unmodified pullulan. A blended amount of each component was adjusted such that a total amount was 100 parts by mass. About 5 g of each of the obtained lotions was applied to the skin of five panelists. Spreadability and stickiness during application, in addition to lastingness of moist feeling (after five hours), were evaluated based on the following criteria. Table 2 shows the average values of the evaluation points of the five panelists.

[Spreadability During Application]
  5 points: Spreads very smoothly and evenly during application
  4 points: Spreads fairly evenly
  3 points: Some unevenness
  2 points: Uneven and does not spread smoothly
  1 point: Does not spread smoothly

[Stickiness]
  5 points: Not sticky
  4 points: Barely sticky
  3 points: Slightly sticky
  2 points: Sticky
  1 point: Very sticky

[Moist Feeling]
  5 points: Feels considerably moist
  4 points: Feels fairly moist
  3 points: Feels slightly moist
  2 points: Feels barely moist
  1 point: Does not feel moist

TABLE 2

|  |  | Example 3 | Example 4 | Example 5 | Example 6 | Comparative Example 3 | Comparative Example 4 | Comparative Example 5 |
|---|---|---|---|---|---|---|---|---|
| 1 | Silicone-modified pullulan obtained in Synthesis Example 1 | 0.5 | | | 2 | | | |
| 2 | Silicone-modified pullulan obtained in Synthesis Example 2 | | 0.5 | | | | | |
| 3 | Silicone-modified hydroxyethyl cellulose obtained in Synthesis Example 3 | | | 0.5 | | | | |
| 4 | Silicone-modified pullulan obtained in Comparative Synthesis Example 1 | | | | | | 0.5 | |
| 5 | Pullulan | | | | | | 0.5 | 2 |
| 6 | 1,3-butylene glycol | 5 | 5 | 5 | 5 | 5 | 5 | 5 |

TABLE 2-continued

|   |   | Example | | | | Comparative Example | | |
|---|---|---|---|---|---|---|---|---|
|   |   | 3 | 4 | 5 | 6 | 3 | 4 | 5 |
| 7 | Concentrated glycerol | 10 | 10 | 10 | 10 | 10 | 10 | 10 |
| 8 | Dipropylene glycol | 6 | 6 | 6 | 6 | 6 | 6 | 6 |
| 9 | Sorbitol | 0.5 | 0.5 | 0.5 | 0.5 | 0.5 | 0.5 | 0.5 |
| 10 | Purified water | Balance | Balance | Balance | Balance | Balance | Balance | Balance |
|   | Total, pts. mass | 100 | 100 | 100 | 100 | 100 | 100 | 100 |
| Evaluation | Stickiness during application | 4.6 | 4.6 | 4.0 | 4.2 | 3.0 | 2.8 | 2.4 |
|   | Spreadability during application | 4.2 | 4.4 | 4.6 | 4.4 | 3.2 | 3.0 | 2.8 |
|   | Lastingness of moist feeling | 4.4 | 4.4 | 4.6 | 4.4 | 2.8 | 2.6 | 2.8 |

As shown in Table 2, the lotions of Examples 3 to 6 had a non-sticky cosmetic film, spread well during application, and had excellent lastingness in moist feeling. In contrast, the lotions of Comparative Examples 3 to 5 had a sticky cosmetic film, had inferior spreadability during application, and had inferior lastingness in moist feeling.

Example 7 and Comparative Examples 6 and 7

An O/W sunscreen was prepared by mixing the silicone-modified pullulan obtained in Synthesis Example 2, the silicone-modified pullulan obtained in Comparative Synthesis Example 1, unmodified pullulan, and other components at a blending ratio shown in Table 3 below as described in the following. An amount of each component was adjusted such that a total amount was 100 parts by mass.
<Preparation of O/W Sunscreen Cosmetic>
  A: Components (1), (3), and (12) to (15) were uniformly mixed at 85° C.
  B: Components (4) to (9) were uniformly mixed at 85° C.
  C: At 80° C., the mixture obtained in B described above, a component (10), and a component (11) were added to the mixture obtained in A described above, emulsified, and slowly cooled to obtain the O/W sunscreen.

However, in Comparative Example 6, the component (2) was added in Step B (an oil phase).
[Sensory Evaluation Method]
About 2 g of the O/W sunscreen obtained above was applied to the skin of five panelists. Stickiness during application, makeup durability (after five hours), and washability with hot water at 35° C. were evaluated based on the following criteria. Table 3 shows the average values of the evaluation points of the five panelists.
[Stickiness During Application]
  5 points: Not sticky
  4 points: Barely sticky
  3 points: Slightly sticky
  2 points: Sticky
  1 point: Very sticky
[Makeup Durability]
  5 points: Makeup is not at all ruined
  4 points: Makeup is barely ruined
  3 points: Makeup is slightly ruined
  2 points: Makeup is fairly ruined
  1 point: Makeup is considerably ruined

[Washability with Hot Water]
  5 points: Washes off completely
  4 points: Washes off almost entirely
  3 points: Washes off to some extent
  2 points: Barely washes off
  1 point: Does not wash off at all

TABLE 3

|   |   | Example | Comparative Example | |
|---|---|---|---|---|
|   |   | 7 | 6 | 7 |
| 1 | Silicone-modified pullulan obtained in Synthesis Example 2 | 0.4 | | |
| 2 | Silicone-modified pullulan obtained in Comparative Synthesis Example 1 | | 0.4 | |
| 3 | Pullulan | | | 0.4 |
| 4 | Polyglyceryl laurate-10 | 3.5 | 3.5 | 3.5 |
| 5 | Glyceryl stearate | 3 | 3 | 3 |
| 6 | Behenyl alcohol | 3 | 3 | 3 |
| 7 | Ethylhexyl methoxycinnamate | 5 | 5 | 5 |
| 8 | Isononyl isononanate | 5 | 5 | 5 |
| 9 | Caprylic acid/Capric acid, Palm alkyl | 5 | 5 | 5 |
| 10 | Silicone-treated fine particulate zinc oxide dispersion (Note 1) | 10 | 10 | 10 |
| 11 | Metallic soap-treated fine particulate titanium oxide dispersion (Note 2) | 10 | 10 | 10 |

TABLE 3-continued

|  |  | Example | Comparative Example | |
|---|---|---|---|---|
|  |  | 7 | 6 | 7 |
| 12 | 1,3-butylene glycol | 10 | 10 | 10 |
| 13 | Ethanol | 6 | 6 | 6 |
| 14 | Ethylhexyl glycerol | 0.2 | 0.2 | 0.2 |
| 15 | Purified water | Balance | Balance | Balance |
| Total, pts. mass |  | 100 | 100 | 100 |
| Evaluation | Stickiness during application | 4.8 | 3.8 | 2.4 |
|  | Makeup durability | 4.4 | 4.0 | 2.4 |
|  | Washability with hot water | 4.6 | 1.2 | 4.6 |

(Note 1)
SPD-Z5: Manufactured by Shin-Etsu Chemical Co., Ltd.
(Note 2)
SPD-T5: Manufactured by Shin-Etsu Chemical Co., Ltd.

As shown in Table 3, the O/W sunscreen of Example 7 had a non-sticky cosmetic film, had good makeup durability, and was able to be washed off with hot water. In contrast, the O/W sunscreens of Comparative Examples 6 and 7 had a sticky cosmetic film and had poor makeup durability. The O/W sunscreen of Comparative Example 6 was not able to be washed off with hot water, therefore an oil cleansing agent was required to wash off.

[Example 8] Hydrating O/W Cream

|  | Component | Mass (%) |
|---|---|---|
| 1. | Silicone-modified pullulan (white powder) of Synthesis Example 1 | 1.0 |
| 2. | Liquid paraffin | 4.5 |
| 3. | Macadamia nut oil | 5.0 |
| 4. | Dimethylpolysiloxane (viscosity 6 mm²/sec: 25° C.) | 5.0 |
| 5. | Octyl paramethoxycinnamate | 5.0 |
| 6. | Alkyl-modified branched polyglycerol-modified silicone (Note 1) | 1.5 |
| 7. | Propylene glycol | 8.0 |
| 8. | Glycerol | 3.0 |
| 9. | Antiseptic | 0.5 |
| 10. | Perfume | 0.2 |
| 11. | Purified water | 66.3 |
| Total |  | 100.0 |

(Note 1)
KF-6105: Manufactured by Shin-Etsu Chemical Co., Ltd.

<Preparation of Cosmetic>

A: The components 2 to 6 were uniformly mixed.

B: After mixing the components 1 and 7 to 11, the mixture was added to the mixture obtained in Step A and emulsified to obtain a hydrating O/W cream.

The obtained hydrating O/W cream had a highly stable formulation, spread lightly, felt refreshing during use, and had a long-lasting moist effect.

[Example 9] Creamy Lipstick

|  | Component | Mass (%) |
|---|---|---|
| 1. | Palmitic acid/ethylhexanoic acid dextrin (Note 1) | 9.0 |
| 2. | Triethylhexanoin | 7.0 |
| 3. | Silicone-modified hydroxyethyl cellulose (white powder) of Synthesis Example 3 | 2.0 |
| 4. | Alkyl-modified crosslinked dimethylpolysiloxane (Note 2) | 8.0 |
| 5. | Alkyl-modified branched polyglycerol-modified silicone (Note 3) | 2.0 |
| 6. | Decamethylcyclopentasiloxane | 35.0 |
| 7. | 1,3-butylene glycol | 4.8 |
| 8. | Purified water | 24.0 |
| 9. | Coloring pigment | 6.0 |
| 10. | Mica | 2.0 |
| 11. | Perfume | 0.2 |
| Total |  | 100.0 |

(Note 1)
Rheopearl TT: Manufactured by Chiba Flour Milling Co., Ltd.
(Note 2)
KSG-43: Manufactured by Shin-Etsu Chemical Co., Ltd.
(Note 3)
KF-6105: Manufactured by Shin-Etsu Chemical Co., Ltd.

<Preparation of Cosmetic>

A: The component 1, some of the component 2, and the components 4 to 6 were heated and uniformly mixed.

B: The component 9 was mixed with the balance of the component 2 and dispersed by a roller, then the mixture was added to the mixture of Step A and uniformly mixed.

C: After the components 3, 7, and 8 were mixed and warmed, the mixture was added to the mixture of Step B and emulsified.

D: The components 10 and 11 were added to the mixture of Step C to obtain a creamy lipstick.

The obtained creamy lipstick spread lightly, spread easily over the lips, was not sticky or oily, and had good makeup durability. This creamy lipstick did not come off with water at 10° C. and was able to be washed off with warm water at 35° C.

[Example 10] Cream Eye Shadow

|  | Component | Mass (%) |
|---|---|---|
| 1. | Decamethylcyclopentasiloxane | 15.0 |
| 2. | Dimethylpolysiloxane (6 cs) | 4.0 |
| 3. | Silicone-modified pullulan (white powder) of Synthesis Example 1 | 0.5 |
| 4. | Branched polyether-modified silicone (Note 1) | 1.5 |
| 5. | Acrylic silicone resin-treated pigment (Note 2) | 16.0 |
| 6. | Sodium chloride | 2.0 |
| 7. | Propylene glycol | 7.5 |
| 8. | Antiseptic | 0.5 |
| 9. | Purified water | 53.0 |
| Total |  | 100.0 |

(Note 1)
KF-6028P: Manufactured by Shin-Etsu Chemical Co., Ltd.
(Note 2)
KP-574 treatment: Manufactured by Shin-Etsu Chemical Co., Ltd.

<Preparation of Cosmetic>

A: The components 1, 2, and 4 were mixed, then the component 5 was added and the mixture was uniformly mixed and dispersed.

B: The components 3 and 6 to 9 were mixed.

C: The mixture of Step B was added to the mixture of Step A and emulsified to obtain a cream eye shadow.

The cream eye shadow obtained as per the description above spread lightly, was not oily or powdery, and had good durability.

[Example 11] Sun Blocking Milky Lotion

| | Component | Mass (%) |
|---|---|---|
| 1. | Crosslinked polyether-modified silicone (Note 1) | 3.0 |
| 2. | Crosslinked dimethylpolysiloxane (Note 2) | 2.0 |
| 3. | Branched polyether-modified silicone (Note 3) | 1.0 |
| 4. | Silicone-modified pullulan (white powder) of Synthesis Example 1 | 0.5 |
| 5. | Decamethylcyclopentasiloxane | 5.0 |
| 6. | Isotridecyl isononanoate | 4.0 |
| 7. | Titanium oxide dispersion (Note 4) | 25.0 |
| 8. | Zinc oxide dispersion (Note 5) | 35.0 |
| 9. | 1,3-butylene glycol | 2.0 |
| 10. | Sodium citrate | 0.2 |
| 11. | Sodium chloride | 0.5 |
| 12. | Purified water | 21.8 |
| | Total | 100.0 |

(Note 1)
KSG-210: Manufactured by Shin-Etsu Chemical Co., Ltd.
(Note 2)
KSG-15: Manufactured by Shin-Etsu Chemical Co., Ltd.
(Note 3)
KF-6028P: Manufactured by Shin-Etsu Chemical Co., Ltd.
(Note 4)
SPD-T5: Manufactured by Shin-Etsu Chemical Co., Ltd.
(Note 5)
SPD-Z5: Manufactured by Shin-Etsu Chemical Co., Ltd.

<Preparation of Cosmetic>

A: The components 1 to 3, 5, and 6 were uniformly mixed.

B: The components 4 and 9 to 12 were mixed.

C: The mixture of Step B was added to the mixture of Step A and emulsified, then the components 7 and 8 were added to obtain a sun blocking milky lotion.

The sun blocking milky lotion obtained as per the description above spread lightly, was not sticky or oily, and had good sweat resistance.

[Example 12] Tanning Milky Lotion

| | Component | Mass (%) |
|---|---|---|
| 1. | Crosslinked polyether-modified silicone (Note 1) | 2.0 |
| 2. | Crosslinked dimethylpolysiloxane (Note 2) | 3.0 |
| 3. | Polyether-modified silicone (Note 3) | 1.5 |
| 4. | Silicone-modified hydroxyethyl cellulose (white powder) of Synthesis Example 3 | 2.0 |
| 5. | Dimethylpolysiloxane (6 cs) | 10.0 |
| 6. | Decamethylcyclopentasiloxane | 15.3 |
| 7. | Dihydroxyacetone | 2.0 |
| 8. | Glycerol | 8.0 |
| 9. | 1,3-butylene glycol | 5.0 |
| 10. | Sodium citrate | 0.2 |
| 11. | Sodium chloride | 0.5 |
| 12. | Antioxidant | 0.5 |
| 13. | Antiseptic | 0.5 |
| 14. | Perfume | 0.2 |
| 15. | Purified water | 49.3 |
| | Total | 100.0 |

(Note 1)
KSG-210: Manufactured by Shin-Etsu Chemical Co., Ltd.
(Note 2)
KSG-15: Manufactured by Shin-Etsu Chemical Co., Ltd.
(Note 3)
KF-6017: Manufactured by Shin-Etsu Chemical Co., Ltd.

<Preparation of Cosmetic>

A: The components 1 to 3, 5, and 6 were uniformly mixed.

B: The components 4 and 7 to 13, and the component 15 were mixed.

C: The mixture of Step B was added to the mixture of Step A and emulsified, then the component 14 was added to obtain a tanning milky lotion.

The tanning milky lotion obtained as per the description above was not sticky, spread lightly, was not oily, and felt refreshing during use.

[Example 13] Hair Cream

| | Component | Mass (%) |
|---|---|---|
| 1. | Decamethylcyclopentasiloxane | 16.0 |
| 2. | Methylphenylpolysiloxane (Note 1) | 2.0 |
| 3. | Silicone-modified pullulan (white powder) of Synthesis Example 2 | 0.4 |
| 4. | Squalane | 5.0 |
| 5. | Silicone network resin dissolved material (Note 2) | 2.0 |
| 6. | Sorbitan sesquiisostearate | 1.5 |
| 7. | Alkyl-modified branched polyether-modified silicone (Note 3) | 2.0 |
| 8. | Sorbitol sodium sulfate | 2.0 |
| 9. | Chondroitin sodium sulfate | 1.0 |
| 10. | Sodium hyaluronate | 0.5 |
| 11. | Propylene glycol | 2.3 |
| 12. | Antiseptic | 1.5 |
| 13. | Vitamin E acetate | 0.1 |
| 14. | Antioxidant | 0.5 |
| 15. | Perfume | 0.2 |
| 16. | Purified water | 62.5 |
| | Total | 100.0 |

(Note 1)
KF-54: Manufactured by Shin-Etsu Chemical Co., Ltd.
(Note 2)
KF-7312J: Manufactured by Shin-Etsu Chemical Co., Ltd.
(Note 3)
KF-6038: Manufactured by Shin-Etsu Chemical Co., Ltd.

<Preparation of Cosmetic>

A: The components 1, 2, and 4 to 7, and the components 12 to 14 were uniformly mixed.

B: The components 3, 8 to 11, and 16 were uniformly mixed.

C: During stirring, the mixture obtained in Step B was gradually added to the mixture obtained in Step A and emulsified, then the component 15 was added to obtain a hair cream.

The hair cream obtained as per the description above was not oily, spread lightly, had water resistance, water repellency, and sweat resistance, and also had good durability.

[Example 14] O/W Cream

| | Component | Mass (%) |
|---|---|---|
| 1. | Dimethylpolysiloxane (6 cs) | 7.0 |
| 2. | Stearyl-modified acrylic silicone resin (Note 1) | 8.0 |
| 3. | Silicone-modified pullulan (white powder) of Synthesis Example 1 | 2.0 |
| 4. | Glyceryl triisostearate | 10.0 |
| 5. | Cetanol | 1.0 |
| 6. | Stearic acid | 3.0 |
| 7. | Glyceryl monostearate | 1.5 |
| 8. | Sorbitan sesquioleate | 0.5 |
| 9. | Polyoxyethylene sorbitan monooleate | 1.0 |
| 10. | Sodium hydroxide (1% by mass aqueous solution) | 10.0 |
| 11. | 1,3-butylene glycol | 5.0 |
| 12. | Antiseptic | 0.5 |
| 13. | Perfume | 0.2 |
| 14. | Purified water | 50.3 |
| | Total | 100.0 |

(Note 1)
KP-561P: Manufactured by Shin-Etsu Chemical Co., Ltd.

<Preparation of Cosmetic>

A: The components 1, 2 and 4 to 9 were heated and mixed.

B: The components 3, 10 to 12, and 14 were mixed and heated.

C: During stirring, the mixture of Step B was gradually added to the mixture of Step A and emulsified. After cooling, the component 13 was added to obtain an O/W cream.

It was confirmed that the O/W cream obtained as per the description above was not sticky or oily, was smooth, spread lightly, and felt refreshing during use.

[Example 15] W/O Liquid Foundation

| | Component | Mass (%) |
|---|---|---|
| 1. | Crosslinked polyether-modified silicone (Note 1) | 3.0 |
| 2. | Crosslinked dimethylpolysiloxane (Note 2) | 5.0 |
| 3. | Branched polyether-modified silicone (Note 3) | 2.0 |
| 4. | Decamethylcyclopentasiloxane | 20.0 |
| 5. | Cetyl isooctanoate | 5.0 |
| 6. | Silicone-modified pullulan (white powder) of Synthesis Example 1 | 2.5 |
| 7. | Dimethyl distearyl ammonium hectorite | 1.2 |
| 8. | Foundation pigment (silicone-treated) (Note 4) | 14.0 |
| 9. | Acrylic silicone resin dissolved material (Note 5) | 10.0 |
| 10. | 1,3-butylene glycol | 5.0 |
| 11. | Xanthan gum | 0.1 |
| 12. | Sodium citrate | 0.2 |
| 13. | Sodium chloride | 0.5 |
| 14. | Antiseptic | 0.5 |
| 15. | Perfume | 0.2 |
| 16. | Purified water | 30.8 |
| | Total | 100.0 |

(Note 1) KSG-210: Manufactured by Shin-Etsu Chemical Co., Ltd.
(Note 2) KSG-15: Manufactured by Shin-Etsu Chemical Co., Ltd.
(Note 3) KF-6028P: Manufactured by Shin-Etsu Chemical Co., Ltd.
(Note 4) KF-9909 treatment: Manufactured by Shin-Etsu Chemical Co., Ltd.
(Note 5) KP-575: Manufactured by Shin-Etsu Chemical Co., Ltd.

<Preparation of Cosmetic>

A: Some of the component 4 and the component 9 were mixed, and the component 8 was uniformly dispersed.

B: The balance of the components 1 to 3 and 4, and the components 5 and 7 were uniformly mixed.

C: The components 6 and 10 to 14, and the component 16 were uniformly mixed.

D: During stirring, the mixture of Step C was gradually added to the mixture of Step B and emulsified, and further, the mixture of Step A and the component 15 were added to obtain a W/O liquid foundation.

The W/O liquid foundation obtained as per the description above was not sticky or oily, spread lightly, had good makeup durability, had a stable formulation, and it also did not have secondary adhesion. This W/O liquid foundation did not come off with water and was able to be washed off with warm water.

INDUSTRIAL APPLICABILITY

The cosmetic composition of the present invention is not oily or sticky, has water resistance and oil resistance, and has excellent makeup durability. Therefore, it is possible to provide a cosmetic composition that does not come off with water but can be removed with warm water. In particular, the present invention can preferably provide a cosmetic composition in the form of an emulsion and a satisfactory cosmetic composition as a makeup primer, a liquid foundation, a sun blocking milky lotion, and a sun blocking cream.

The invention claimed is:

1. A cosmetic composition comprising the following components (A) and (B):

(A) a silicone-modified polysaccharide comprising one or more silicone residues bonded to a hydroxyl group in a monosaccharide unit of the polysaccharide, the silicone residues being represented by the following general formula (1):

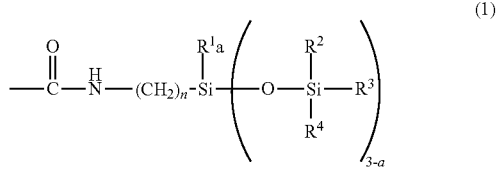

wherein $R^1$, $R^2$, $R^3$ and $R^4$ are, independently of each other, groups selected from an alkyl group having 1 to 8 carbon atoms, a cycloalkyl group having 3 to 8 carbon atoms, a fluorine-substituted alkyl group having 1 to 8 carbon atoms, an aryl group having 6 to 12 carbon atoms, and an aralkyl group having 7 to 12 carbon atoms; n is an integer of 1 to 10; and a is an integer of 0 to 3, and having an average number of the silicone residues bonded to one mol of the monosaccharide unit of 0.001 mol or more and 0.1 mol or less, in an amount of 0.05% to 20% by mass, based on a total mass of the cosmetic composition, and (B) water in an amount of 5% to 99% by mass, based on the total mass of the cosmetic composition.

2. The cosmetic composition according to claim 1, wherein the polysaccharide is selected from pullulan, cellulose, chitin, chitosan, starch, mannan, hyaluronic acid, and a derivative thereof.

3. The cosmetic composition according to claim 2, wherein the polysaccharide is pullulan, and an average number of the silicone residues bonded to one mol of a glucose unit is 0.001 mol or more and 0.1 mol or less.

4. The cosmetic composition according to claim 2, wherein the silicone-modified polysaccharide is biodegradable.

5. The cosmetic composition according to claim 1, further comprising at least one selected from propylene glycol, trimethylene glycol, dipropylene glycol, 1,3-butylene glycol, methylpropanediol, pentylene glycol, glycerol, diglycerol, ethylhexyl glycerol, triglycerol, polyglycerol, and ethanol.

6. The cosmetic composition according to claim 1, further comprising at least one selected from a silicone oil, a hydrocarbon oil, and an ester oil.

7. The cosmetic composition according to claim 1, further comprising a powder.

8. The cosmetic composition according to claim 1, wherein the cosmetic composition is in a form of an emulsion.

9. The cosmetic composition according to claim 3, wherein the silicone-modified polysaccharide is biodegradable.

10. The cosmetic composition according to claim 2, further comprising at least one selected from propylene glycol, trimethylene glycol, dipropylene glycol, 1,3-butylene glycol, methylpropanediol, pentylene glycol, glycerol, diglycerol, ethylhexyl glycerol, triglycerol, polyglycerol, and ethanol.

11. The cosmetic composition according to claim 3, further comprising at least one selected from propylene glycol, trimethylene glycol, dipropylene glycol, 1,3-butylene glycol, methylpropanediol, pentylene glycol, glycerol, diglycerol, ethylhexyl glycerol, triglycerol, polyglycerol, and ethanol.

12. The cosmetic composition according to claim 4, further comprising at least one selected from propylene glycol, trimethylene glycol, dipropylene glycol, 1,3-butylene glycol, methylpropanediol, pentylene glycol, glycerol, diglycerol, ethylhexyl glycerol, triglycerol, polyglycerol, and ethanol.

13. The cosmetic composition according to claim 2, further comprising at least one selected from a silicone oil, a hydrocarbon oil, and an ester oil.

14. The cosmetic composition according to claim 3, further comprising at least one selected from a silicone oil, a hydrocarbon oil, and an ester oil.

15. The cosmetic composition according to claim 4, further comprising at least one selected from a silicone oil, a hydrocarbon oil, and an ester oil.

16. The cosmetic composition according to claim 5, further comprising at least one selected from a silicone oil, a hydrocarbon oil, and an ester oil.

17. The cosmetic composition according to claim 2, further comprising a powder.

18. The cosmetic composition according to claim 3, further comprising a powder.

19. The cosmetic composition according to claim 2, wherein the cosmetic composition is in a form of an emulsion.

20. The cosmetic composition according to claim 3, wherein the cosmetic composition is in a form of an emulsion.

* * * * *